United States Patent Office 3,291,490
Patented Dec. 13, 1966

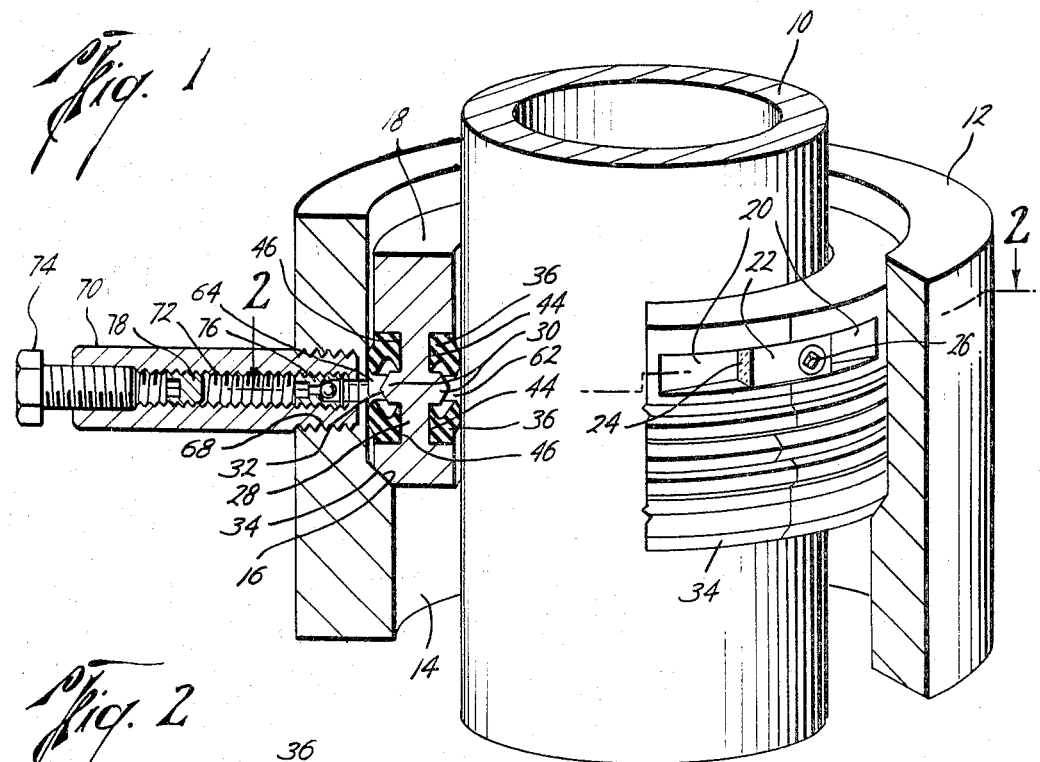
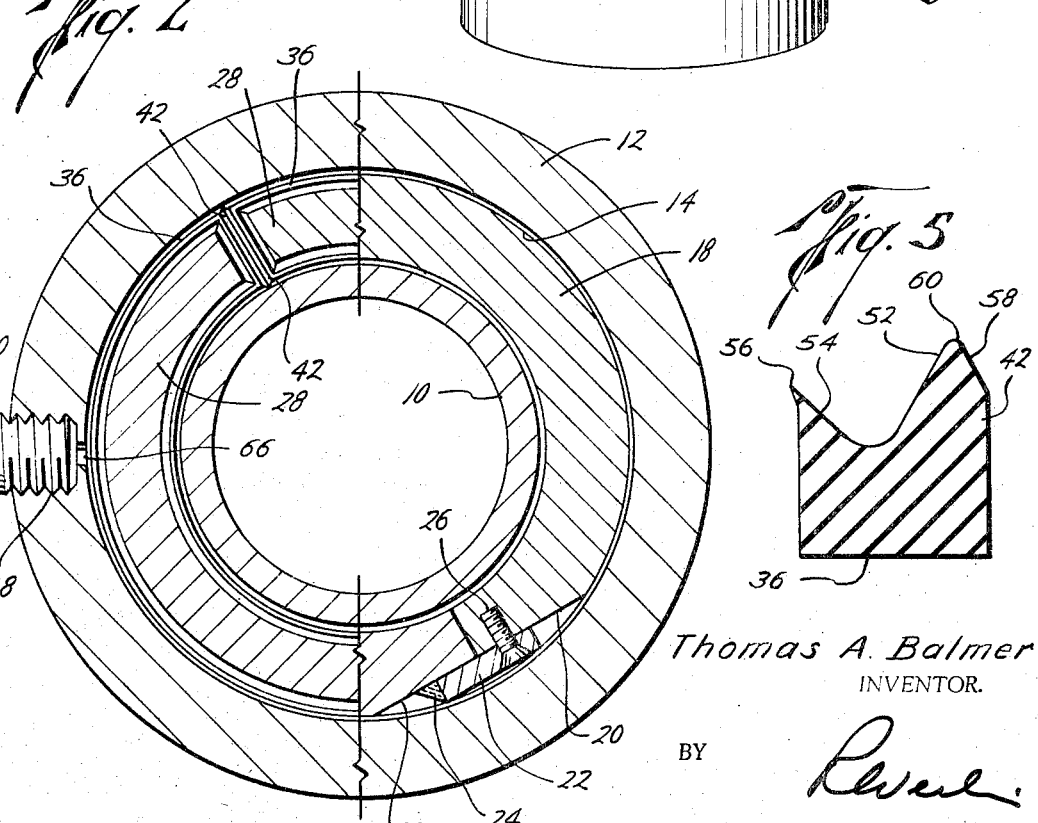

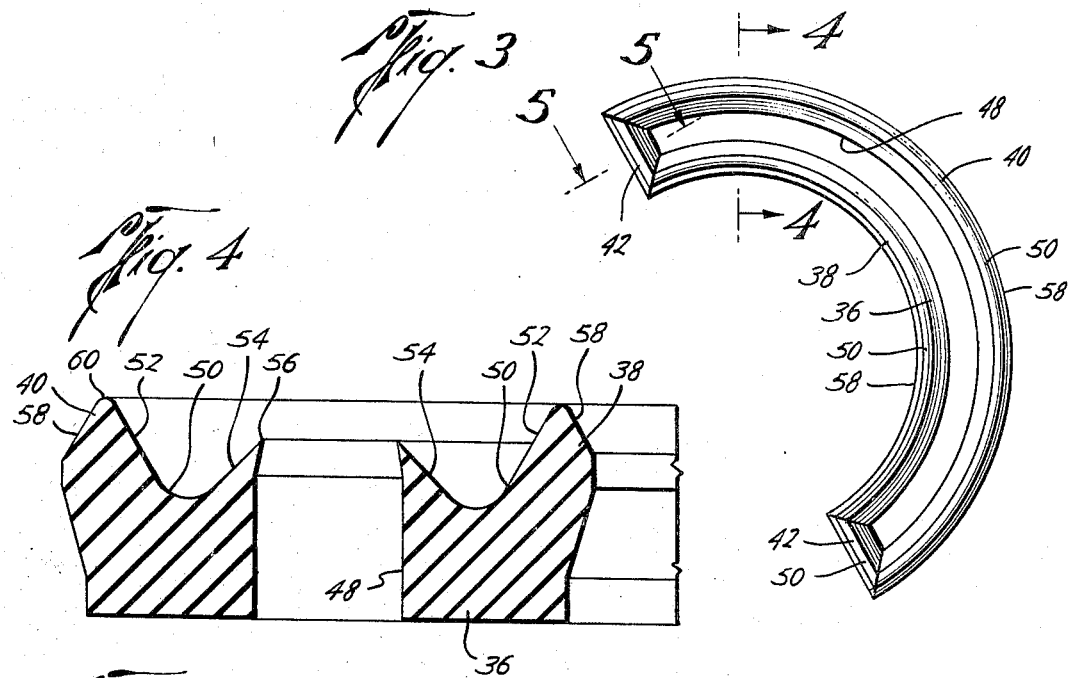
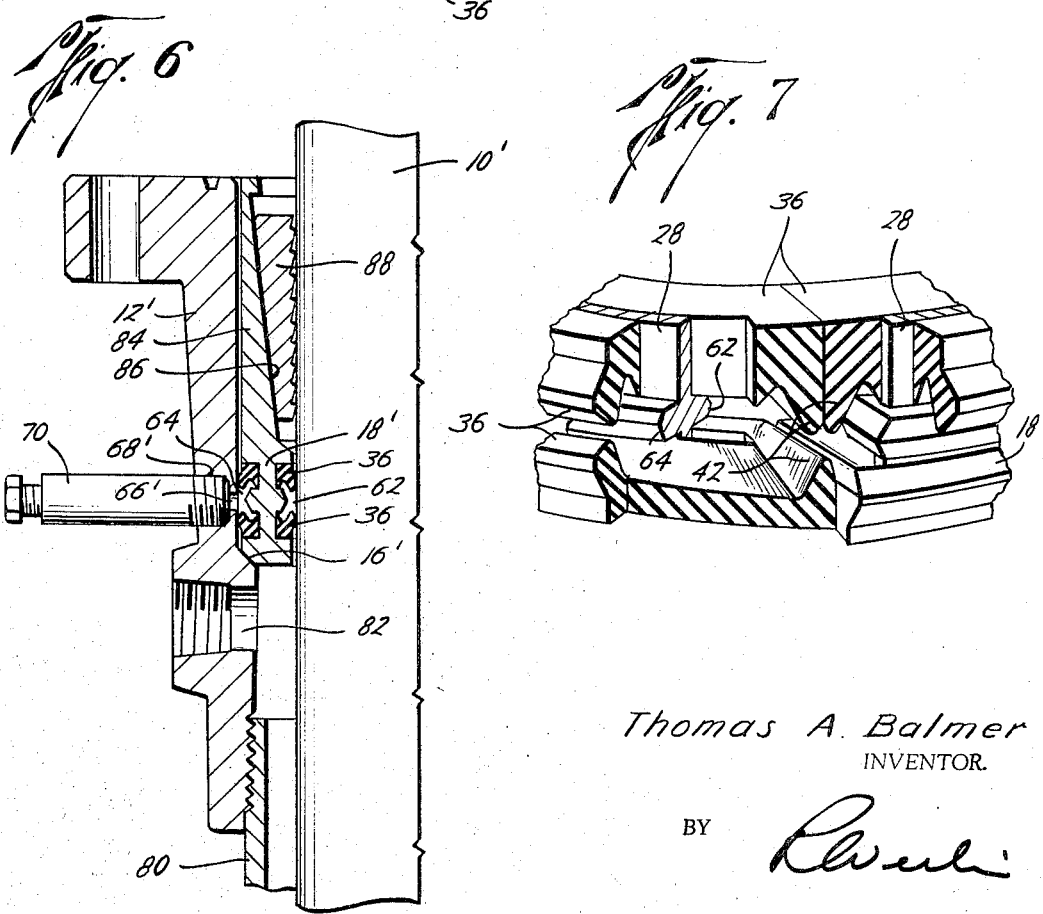
Thomas A. Balmer
INVENTOR.

3,291,490
SEALING ASSEMBLY
Thomas A. Balmer, Beaumont, Tex., assignor to Gulf Coast Machine & Supply Company, Beaumont, Tex., a corporation of Texas
Filed June 12, 1963, Ser. No. 287,327
4 Claims. (Cl. 277—21)

This invention relates to a sealing assembly, and more particularly to seal forming means for use in sealing off an annulus between two concentrically arranged tubular members one positioned within the other.

The invention is capable of broad application as a seal forming means between inner and outer cylindrical parts and finds particular utility in connection with well apparatus in which an inner pipe or tubing is suspended in a well bore by well head apparatus including a tubing hanger assembly and in which it is desired to maintain a fluid tight seal between the tubing and a surrounding well casing.

The invention has for an important object the provision of a seal forming assembly for use between inner and outer concentrically arranged tubular members which functions independently of any load to which the members are subjected.

Another object of the invention is to provide a seal forming assembly for use in forming a seal between tubular parts arranged one within another embodying a retainer or seal carrying member shaped to be positioned between the parts, seal forming elements carried by the retainer and shaped to form an annular pressure chamber between the parts and means for introducing fluid under pressure into the chamber to expand the elements into sealing engagement with the parts.

A further object of the invention is the provision in a seal forming assembly for use between tubular parts arranged one within another including an annular retainer or seal carrying member and seal forming elements carried thereby, of means for supporting the retainer between the parts to hold the seal forming elements out of load transmitting relation to the parts.

Another object of the invention is to provide a seal forming assembly for use with well head equipment including a slip bowl positioned between a well casing and a well tubing extending into the casing and suspended on slips carried by the bowl, seal forming elements carried by the bowl in position for sealing engagement with the well head and tubing to close the annulus therebetween and means for supporting the bowl on the well head in a manner to prevent the application of a compressive force to the elements by the weight of the tubing on the bowl.

A further object of the invention is to provide a seal forming assembly of the type referred to in which the retainer or seal carrying member is formed in a number of curved sections adapted to be assembled to form an annular body and the seal forming elements are of arcuate shape adapted to be positioned on the retainer sections to form annular seals extending about the retainer in position for sealing engagement with the parts to close the annulus between the parts.

The above and other important objects and advantages of the invention will be apparent from the following detailed description, reference being had to the annexed drawings, wherein—

FIGURE 1 is a side elevational view, partly broken away and partly in cross-section, illustrating a preferred embodiment of the invention and showing the sealing assembly applied to two concentrically arranged tubular parts;

FIGURE 2 is a cross-sectional view, taken along the line 2—2 of FIGURE 1, looking in the direction indicated by the arrows;

FIGURE 3 is a top plan view of one of the expansible seal forming elements of the invention;

FIGURE 4 is a cross-sectional view, on an enlarged scale, taken along the line 4—4 of FIGURE 3, looking in the direction indicated by the arrows;

FIGURE 5 is a cross-sectional view, on an enlarged scale, taken along the line 5—5 of FIGURE 3, looking in the direction indicated by the arrows;

FIGURE 6 is a fragmentary, vertical, central cross-sectional view illustrating another preferred embodiment of the invention, as applied to a well head assembly in which a well tubing is supported by slip mechanism on a well casing and in which the annulus between the tubing and casing is sealed by the sealing assembly of the invention; and FIGURE 7 is a fragmentary perspective view, partly broken away, and partly in cross-section, showing details of the inner structure of the assembly.

Referring now to the drawings in greater detail, the invention is illustrated herein in FIGURES 1 to 5 in connection with its use as a sealing means between inner and outer tubular members 10 and 12, respectively, which may be in the nature of pipes or tubular articles or the like, for the purpose of sealing off the annulus 14 formed between them.

The outer member 12 has an internal shoulder 16 forming an annular seat therein upon which the sealing assembly is seated.

The seal assembly of the invention includes a seal carrier or retainer member 18, of annular shape, formed in two semi-circular parts, adapted to be assembled and secured together, as by means of external slots 20 in each part, positioned for circumferential alignment, and within which fastening means, such as the lug 22, is positioned, which lug is secured at one end to one of the parts by welding, as indicated at 24, and to the other of the parts by a bolt 26, extending through an opening in the lug, and threadably connected to the other part. The carrier member 18 has an intermediate section which is of generally H shape in cross-section, having a central web 28, which is formed, intermediate its ends, with internal and external, annular porjections 30 whose outer extremities may be provided with radially converging, bevelled faces, such as those indicated at 32. The projections define with the webs inner and outer grooves 44 and 46, respectively, above and below the projections. The seal carrying member is of somewhat larger internal diameter than the external diameter of the inner tubular member 10 and the external diameter of the carrier is slightly smaller than the internal diameter of the outer tubular member 12 above the shoulder 16, to allow the retainer to be readily inserted between the tubular members. The retainer is also provided with an external bevelled face 34 at its lower end positioned to seat on the shoulder 16 when the retainer is inserted in position between the tubular members.

The assembly includes semi-circular seal-forming elements 36, of which there are four in the present illustration, formed of resilient material such as rubber or the like, each having inner and outer radially spaced, circumferentially extending, semi-circular portions 38 and 40, respectively, connected together at their opposite ends by radially extending end portions 42. Four such seal-forming elements are employed in the present illustration, two of the elements being mounted on each of the semi-circular parts of the retainer member 18, in the longitudinally spaced inner and outer grooves 44 and 46, respectively, on each side of the projections 30 thereof.

The inner and outer, semi-circular portions 38 and 40, and the end portions 42, of the seal-forming elements, provide between them a semi-circular opening 48 through the element and each element has an outwardly opening groove 50, in one face, extending entirely about the element in the semi-circular portions 38 and 40 and the end portions 42, which groove is formed with inwardly converging side faces 52 and 54, the inner side faces 54 forming with the opening 48 an inner lip 56 extending entirely about the opening. Each seal-forming element is also formed with an external bevelled face 58, extending entirely about the element and which forms with the outer face 52 of the groove 50 an outer sealing lip 60, extending entirely about the element.

The seal-forming elements are placed on the retainer member 18 in the manner best illustrated in FIGURE 1, by pulling the inner and outer semi-circular portions 38 and 40 apart to allow the end of the semi-circular part of the member to be inserted through the opening 48 to position the inner semi-circular portion 38 in one of the inner grooves 44 of the retainer part and the outer semi-circular portion 40 of the element to be positioned in the corresponding outer groove 46 of the retainer part, with the groove 50 opening toward the projections 30 of the retainer. The seal-forming elements are of somewhat greater radial width than the depths of the grooves 44 and 46 of the retainer, so that the seal forming elements will extend inwardly and outwardly radially, somewhat beyond the grooves for sealing engagement with the inner surface of the outer tubular member 12 and the outer surface of the inner tubular member 10, when the seal forming assembly is in position between the tubular members, as best illustrated in FIGURE 1. When the seal forming elements have been thus positioned on the parts of the retainer, the parts may then be assembled and secured together by the lugs 22 with the bolts 26, so that the end portions 42 of the seal forming elements will be in engagement to form a seal between the parts of the retainer. The assembly may then be inserted between the tubular members 10 and 12 with the retainer in engagement with the shoulder 16 and the inner and outer sealing portions of the elements extending outwardly from the grooves 44 and 46 into sealing contact with the tubular members to close their annulus 14 between the members.

It will be apparent that when the assembly is thus positioned between the tubular members the grooves 50 of the seal forming elements are open inwardly toward each other to form with the annular projections 30 of the retainer and the adjacent wall portions of the inner and outer tubular members 10 and 12, inner and outer annular chambers 62 and 64, which are in communication between the seal forming elements.

The outer tubular member is provided with an inlet passageway 66, positioned to open into the chamber 64 between the seal forming elements of the assembly, and with an internally threaded counterbore 68, in communication with the passageway 66, and into which a pressure fitting 70 is threaded. The pressure fitting 70 has an internally threaded bore 72 into whose outer end a plug 74 is threaded and within the bore an inwardly opening check-valve 76 is located. An externally threaded plug 78 is also threaded into the bore 72, in outwardly spaced relation to the check-valve 76.

In making use of the seal assembly the annular chambers 60 and 64 are filled with a suitable fluid such as grease or oil, and the bore 72 and passageway 66, inwardly of the screw plug 78, are also similarly filled. With the assembly thus in position and filled, it will be apparent that pressure may be applied to the fluid by screwing in the plug 78 to apply pressure to the seal forming elements in the grooves 50 thereof, to expand the elements into tight sealing engagement with the tubular members and with the retainer 18, to form a fluid tight seal between the tubular members. Under such pressure it will be apparent that the lips 56 of the seal forming elements will be tightly expanded into sealing engagement with the retainer in the grooves 44 and 46, while the outer lip portions 60 of the seal forming elements will be tightly expanded into sealing contact with the tubular members to effectively close the annulus 14.

A further embodiment of the invention is illustrated in FIGURE 6 wherein the invention is shown in connection with its use in a well head structure to form a seal between a well casing and an inner pipe or tubing, suspended from the well head. In this embodiment of the invention the well head 12', of conventional design, is attached to the upper end of a well casing 80, the well head being provided with the usual side flow opening 82, through which fluid may flow into and out of the casing externally of the well tubing 10'. The well head mechanism includes a slip bowl 84, removably positioned in the well head 12' and having an internal downwardly tapering annular seat 86 and within which downwardly tapering slips, such as that shown at 88 are positioned about the tubing 10' in engagement with the seat 86, in clamping engagement with the tubing, to hold the tubing against downward movement in the well. The lower end portion of the slip bowl is shaped to provide a seal carrier or retainer 18', similar to the retainer 18, previously described, and upon which the seal forming elements 36 are mounted in the same manner, in position for sealing engagement with the external surface of the tubing 10' and the surrounding internal surface of the well head 12', to seal off the annulus between the tubing and well head above the side flow opening 82. The slip bowl may be formed in two semi-circular parts, which are assembled and connected together in the same manner as the retainer member 18 previously described. The seal forming assembly in this embodiment of the invention provides the same annular pressure fluid chambers 62 and 64, previously described, and the well head 12' has an inlet passageway 66' and a counterbore 68' into which the pressure fitting 70 is threaded, by which pressure may be applied to a suitable fluid, filling the chambers to expand the sealing elements into fluid tight sealing engagement with the well head and tubing.

It will be apparent that due to the seating of the slip bowl on the internal shoulder 16' of the well head structure, the seal forming elements are not subjected to any pressure resulting from the load applied to the slips when the tubing 10' is suspended by the slips. Thus, compression of the seal forming elements or deformation of the same due to the weight of the suspended tubing is prevented and the sealing effect of the assembly is obtained by the pressure of fluid in the chambers 62 and 64, which is under the control of the operator.

It will thus be seen that the invention contsructed as described above provides a seal forming assembly which is of simple design and rugged construction, which is easily inserted and removed, and in which the parts are readily replaceable.

The invention is disclosed herein in connection with certain specific embodiments of the same, but it will be understood that these are intended by way of example only and that various modifications may be made in the construction and arrangement of the parts, within the spirit of the invention and the scope of the appended claims.

Having thus clearly shown and described the invention, what is claimed as new and desired to secure by Letters Patent, is:

1. An assembly for sealing an annular space between concentric tubular members, comprising, an annular body receivable in the annular space, said body having axially spaced upper and lower pairs of annular grooves in the external and internal peripheries of said body, arcuate resilient seal-forming elements mounted in each of said annular grooves, said elements in said upper grooves being separate from said elements in said lower grooves and being substantially identical in shape, one end of each of said seal-forming elements having an annular recess defining radially spaced annular inner and outer sealing lips projecting from said one end, the lip-bearing ends of each of said pairs of seal-forming elements being disposed in axially opposed spaced apart relation to define an annular outwardly opening chamber therebetween, said body axial surfaces being closely adjacent said concentric tubular members with a minimum tolerance, said body being formed of a plurality of arcuate segments having opposed longitudinally extending end faces in abuttting relation, a passage extending continuously across each of said faces and joining together said respective external and internal grooves, said elements including an integral end portion interconnecting said element portions in said external and internal grooves, and defining in part, a passageway interconnecting said radially inner and outer grooves in said body, said element end portion being positioned in said passage at said faces to provide fluid communication between said external and internal grooves and being so positioned to seal against leakage of fluid out of said chamber, means for introducing pressurized fluid into said annular chambers from the exterior of said body including a passage extending through said outer tubular member and terminating adjacent said external body periphery between said lip-bearing ends, to urge the radially inner ones of said lips into sealing engagement with the adjacent surfaces of said body and the radially outer ones of said lips into sealing engagement with the opposed surfaces of said tubular members, and valve means maintaining said fluid under pressure in said chamber.

2. The assembly according to claim 1 wherein said body is formed of a pair of arcuate segments, each segment having a pair of seal-forming elements, and means for rigidly securing together said segments to form said annular body.

3. The assembly according to claim 1 wherein said element end portions in one segment end face are in abutting relation to corresponding element end portions in adjacent segment end faces whereby leakage along said end faces is prevented.

4. The assembly according to claim 3 wherein said element end portions have a transverse cross-sectional shape identical to the transverse cross-sectional shape of said element portions in said internal and external peripheries.

References Cited by the Examiner

UNITED STATES PATENTS

| 2,291,143 | 7/1942 | Brown et al. | 285—96 |
| 2,491,599 | 12/1949 | Allen | 285—144 X |
| 2,531,596 | 11/1950 | Allen | 285—96 |
| 2,536,898 | 1/1951 | Works | 285—96 |
| 2,733,938 | 2/1956 | Davis | 285—146 |
| 2,751,235 | 6/1956 | Watts | 285—144 X |
| 2,910,309 | 10/1959 | Snyder | 285—110 X |
| 3,051,513 | 8/1962 | Watts | 285—146 |

FOREIGN PATENTS

| 867,830 | 5/1961 | Great Britain. |

THOMAS F. CALLAGHAN, *Primary Examiner.*

S. R. MILLER, *Examiner.*

D. W. AROLA, *Assistant Examiner.*